GEORGE W. COLBORN.
Improvement in Methods of Attaching Saws to their Arbors.
No. 114,926. Patented May 16, 1871.

Witnesses:

Inventor:
Geo. W. Colborn,
by Geo. W. Rothwell,
Attorney.

United States Patent Office.

GEORGE W. COLBORN, OF GARDINER, MAINE.

Letters Patent No. 114,926, dated May 16, 1871.

---

IMPROVEMENT IN METHODS OF ATTACHING SAWS TO THEIR ARBORS.

---

The Schedule referred to in these Letters Patent and making part of the same.

---

*To all whom it may concern:*

Be it known that I, GEORGE W. COLBORN, of Gardiner, in the county of Kennebec and State of Maine, have invented a new and useful Improvement in Shingle-Machine Saw-Shafts; and I do hereby declare the following to be a full, clear, and exact description thereof sufficient to enable those skilled in the art to which my invention appertains to fully understand and to make and use the same, reference being had to the accompanying drawing forming part of this specification, and in which—

Figure 1:
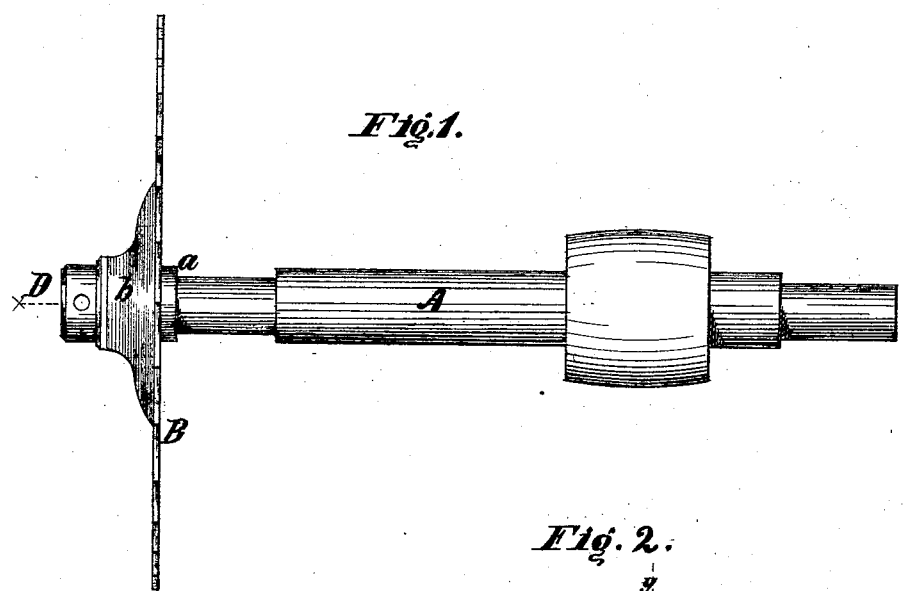
Figure 1 is a side view of a saw-shaft and saw embodying my invention.

My invention is principally intended for use on shingle-machines, and it is an improvement in saw-shafts and the method of attaching the saw thereto.

The object of the invention is to provide a saw-shaft and saw so constructed and attached that the saw can be readily removed from its shaft to be sharpened and another one substituted, thus preventing the delay in the running of the machine which would otherwise occur when the saws require filing.

The invention consists in the construction of the shaft, saw, and fastening-nut, as hereinafter set forth.

Referring to the drawing, in which similar letters of reference indicate like parts in the several figures—

A represents the shaft;

B, the saw; and

D, the fastening-nut.

On the shaft, near its end, is formed a small collar, $a$, which fits into a recess in the center of the saw and in a cast flanged collar, $b$, which is riveted to the saw for the purpose of stiffening and strengthening the same.

The saw is secured by means of a nut, D, screwed onto the outer end of the shaft, which is threaded.

The nut is formed with an opening extending through the same for the insertion of an iron rod, by which the nut is turned.

Figure 3:
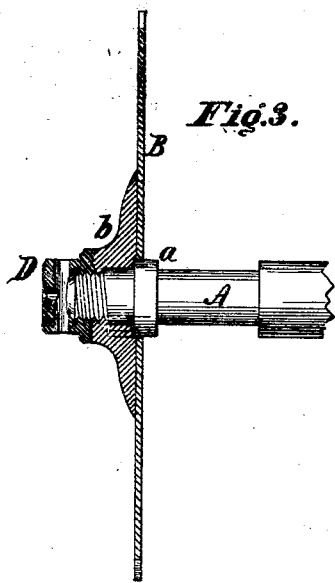
Figure 3 shows the saw in section, mounted on the shaft, the plane of section being indicated by the line $y\ y$, in fig. 2.
Figure 2:
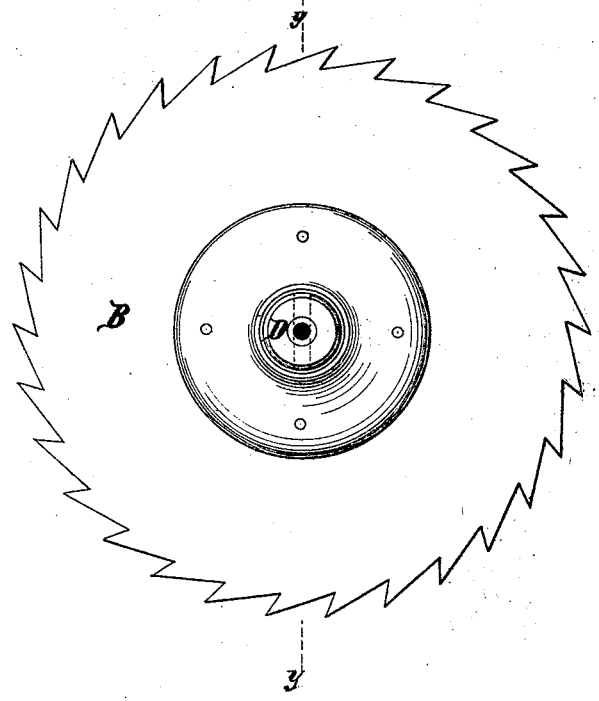
Figure 2 is a front view of the same.

When the nut is tight and the saw is in operation the tendency is not to loosen the nut, but, on the contrary, to render the parts more rigid, and the saw will thus be probably held sufficiently secure by friction, which is rendered greater than usual by recessing the saw and its stiffening-collar to receive the collar on the shaft. But if this attachment should not be deemed sufficiently rigid the shaft-collar may be provided with a pin entering a hole in the saw-collar, as shown in dotted lines in fig. 3, which will effectually prevent any tendency to the turning of the saw independently of the shaft.

When a saw requires sharpening the machine need be stopped only a moment for the removal of the dull saw and the attachment of a sharp one in its place.

I do not claim a saw provided with a stiffening-collar, broadly, nor securing a saw between a collar on the shaft and a nut screwed onto the end of the same; but

Having thus fully described my invention,

What I claim as new, and desire to secure by Letters Patent, is—

A saw having the recessed flanged collar $b$ attached thereto, receiving and partially inclosing the collar $a$ formed on the saw-shaft, the saw being secured by means of the nut D screwed onto the threaded end of the shaft, all constructed and arranged as herein described, for the purpose specified.

In testimony that I claim the above I have hereunto subscribed my name in presence of two witnesses.

GEO. W. COLBORN.

Witnesses:
E. A. NYE,
R. M. MANSUR.